United States Patent
Ryan et al.

(10) Patent No.: US 9,451,482 B2
(45) Date of Patent: Sep. 20, 2016

(54) METHOD FOR TRACKING AND UTILIZING OPERATIONAL RUN TIME OF A NETWORK ELEMENT

(71) Applicant: Eden Rock Communications, LLC, Bothell, WA (US)

(72) Inventors: David James Ryan, Bothell, WA (US); Eamonn Gormley, Bothell, WA (US)

(73) Assignee: Nokia Solutions and Networks OY, Espoo (FI)

( * ) Notice: Subject to any disclaimer, the term of this patent is extended or adjusted under 35 U.S.C. 154(b) by 111 days.

(21) Appl. No.: 14/102,317

(22) Filed: Dec. 10, 2013

(65) Prior Publication Data

US 2014/0269382 A1 Sep. 18, 2014

Related U.S. Application Data

(60) Provisional application No. 61/786,321, filed on Mar. 15, 2013.

(51) Int. Cl.
*G01R 31/08* (2006.01)
*H04W 24/04* (2009.01)

(52) U.S. Cl.
CPC .................... *H04W 24/04* (2013.01)

(58) Field of Classification Search
USPC ................. 370/252, 328, 338, 401
See application file for complete search history.

(56) References Cited

U.S. PATENT DOCUMENTS

| | | | |
|---|---|---|---|
| 6,725,032 B1 * | 4/2004 | Sheridan | H04L 29/06 455/419 |
| 2003/0110250 A1 | 6/2003 | Schnitzer et al. | |
| 2004/0054680 A1 | 3/2004 | Kelley et al. | |
| 2005/0265321 A1 | 12/2005 | Rappaport et al. | |
| 2007/0129082 A1 * | 6/2007 | Thacher | G01C 21/30 455/456.1 |
| 2007/0136234 A1 * | 6/2007 | Levin | G06F 17/30536 |
| 2008/0052763 A1 | 2/2008 | Hum et al. | |
| 2008/0101318 A1 * | 5/2008 | Taaghol | H04W 36/04 370/342 |
| 2008/0244095 A1 * | 10/2008 | Vos | H04L 12/5692 709/250 |
| 2009/0005074 A1 * | 1/2009 | Kahn | H04W 24/02 455/456.2 |
| 2013/0014040 A1 * | 1/2013 | Jagannathan | G06Q 50/01 715/765 |
| 2013/0164712 A1 * | 6/2013 | Hunt | B60W 40/09 434/65 |
| 2013/0324856 A1 * | 12/2013 | Lisogurski | A61B 5/7285 600/476 |
| 2013/0343288 A1 * | 12/2013 | Ratasuk | H04W 72/1215 370/329 |

OTHER PUBLICATIONS

International Search Report and Written Opinion for PCT/US2013/074206, filed Dec. 10, 2013.

* cited by examiner

*Primary Examiner* — Ricky Ngo
*Assistant Examiner* — Christine Ng

(57) ABSTRACT

Techniques for normalizing a performance metric in a wireless communication network include collecting operation data of a network element over a plurality of data collection time periods, determining operational run time of the network element based on the operation data, calculating a normalization value based on the operational run time, and normalizing the performance metric for the network element using the normalization value.

20 Claims, 7 Drawing Sheets

US 9,451,482 B2

METHOD FOR TRACKING AND UTILIZING OPERATIONAL RUN TIME OF A NETWORK ELEMENT

CROSS-REFERENCES TO RELATED APPLICATIONS

The present invention claims priority to U.S. Provisional Application No. 61/786,321, filed Mar. 15, 2013.

BACKGROUND

Self Organizing or Self Optimizing Network technologies (SON) make use of historical performance data, run time metrics and/or call event data to optimize configuration parameters associated with individual network elements and groups of network elements. Such optimizations include Automated Neighbor Relations (ANR) optimization whereby handover statistics from individual cells are tracked and analyzed and the results of that analysis are used to autonomously optimize neighbor lists associated with individual network cells.

However, cellular networks are not static over time. Due to activities such as the introduction of new network cells and maintenance that temporarily suspends operation of cells before returning them to active service, errors in automated metrics based algorithms may be introduced for cells that are not in service or have recently been introduced into service. For example, a cell may be temporarily removed from service for routine maintenance while a system continues to collect performance data for the cell. Low values in performance reports may cause the cell to be removed as a valid neighbor from the neighbor lists of nearby cells due to the apparent drop in performance over the period in which the cell was removed from service.

BRIEF SUMMARY

Embodiments of the present invention relate to the detection and tracking of network element operational status over a performance observation time window. Operational run time may be determined from configuration information and cell performance metrics. Network element operational run time data may be used to normalize relevant activity metrics, which in turn may be used in automated network optimization processes.

In an embodiment, a system for normalizing a performance metric in a wireless communication network includes a memory, a processor, and a non-transitory computer readable medium associated with the processor, the computer readable medium having computer executable instructions stored thereon which, when executed by the processor, perform the following steps: collecting operation data of a network element over a plurality of data collection time periods, determining operational run time of the network element based on the operation data, calculating a normalization value based on the operational run time, and normalizing the performance metric for the network element using the normalization value. The operation data may be performance data and/or configuration data, and the performance data may be a connection activity metric and/or a data throughput metric. The configuration data may be collected from a configuration management system, an alarm management system, or both.

An embodiment includes aligning first operation data with second operation data in time. Aligning the first operation data with the second operation data in time may include interpolation or decimation to match a periodicity of the first operation data to a periodicity of the second operation data.

In an embodiment, determining operational run time of the network element includes determining an operational status for each data collection time period in the plurality of data collection time periods. Determining operational status for each data collection period may include receiving data indicating a locked state or an unlocked state for each collection time period from a configuration management system, designating a first collection time period as non-operational when the data for the first collection time period indicates a locked state, and designating a second collection time period as operational when the data for the first collection time period indicates an unlocked state.

In an embodiment, determining operational status for each data collection period includes receiving performance data values for the plurality of data collection time periods, comparing each performance data value to a threshold value, when a compared performance data value is less than the threshold value, designating a time period associated with the compared performance metric data as non-operational, and when the compared performance data value is more than the threshold value, designating the time period associated with the compared performance metric data as operational.

In an embodiment, the normalized performance metric is weighted according to a weighting factor based on at least the time of day in which the operational run time was determined. The weighting factor may be based on historical or expected performance data.

An embodiment includes determining whether the network element was introduced during a reporting interval with a duration exceeding a threshold value, and when the network element is introduced during the reporting interval with a duration exceeding the threshold value, reporting the normalized performance metric for the network element during the reporting interval exceeding the threshold value.

DETAILED DESCRIPTION

In the following detailed description, reference is made to the accompanying figures, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the figures, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
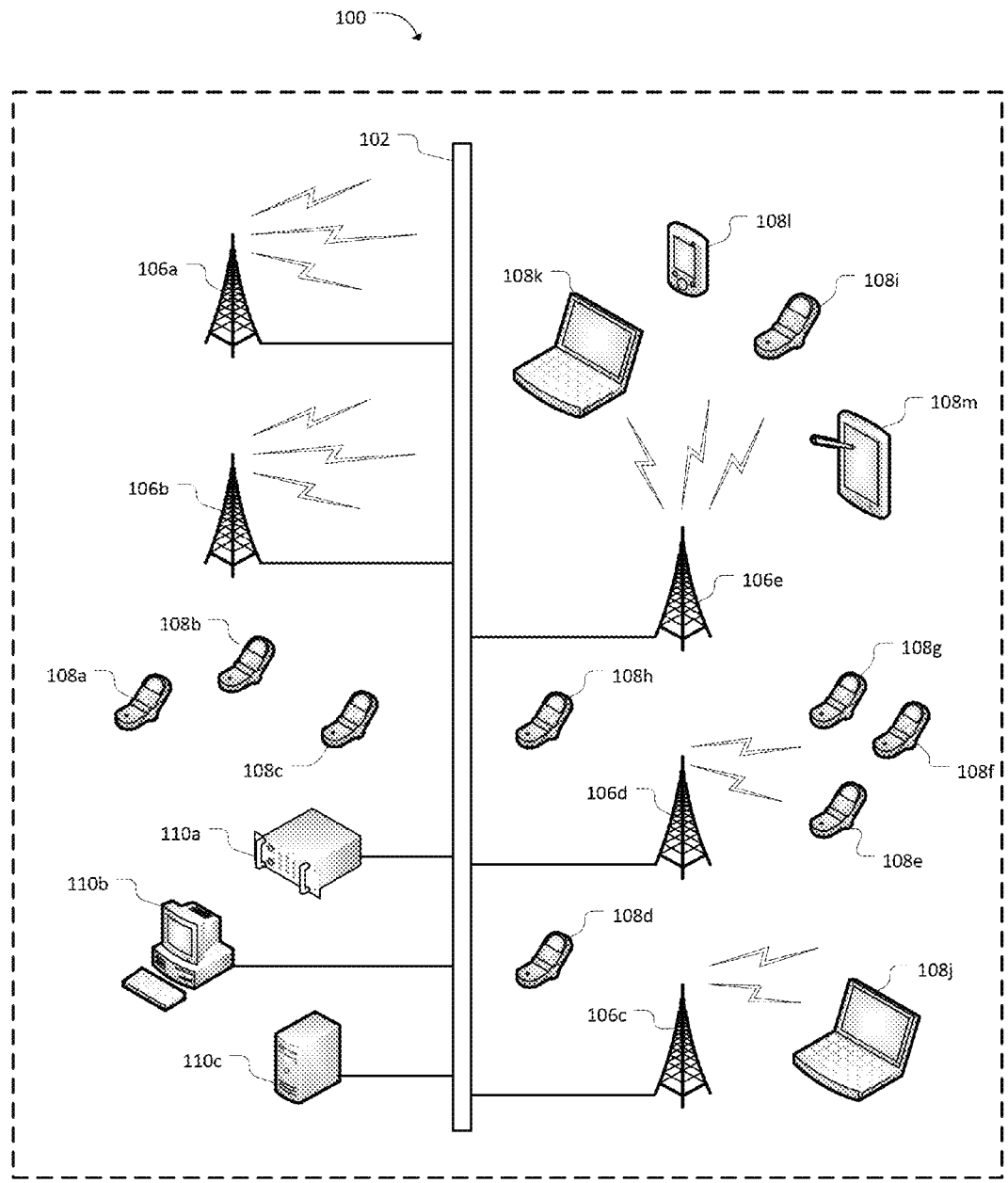
FIG. 1 illustrates a system according to an embodiment.

FIG. 1 illustrates an example wireless communication system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations include macrocells, microcells, picocells, and femtocells.

In a system 100 according to an embodiment of the present invention, the data communications network 102 may include a backhaul portion that can facilitate distributed network communications between any of the network controller devices 110 a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the wireless communication system 100.

In an embodiment, any of the network controller devices 110a-c and/or base stations 106a-e may function independently or collaboratively to implement processes associated with various embodiments of the present disclosure. Further, processes may be carried out via common communications technologies known in the Art, such as those associated with modern Global Systems for Mobile (GSM), Universal Mobile Telecommunications System (UMTS), Long Term Evolution (LTE) network infrastructures, etc.

In accordance with a standard GSM network, any of the network controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
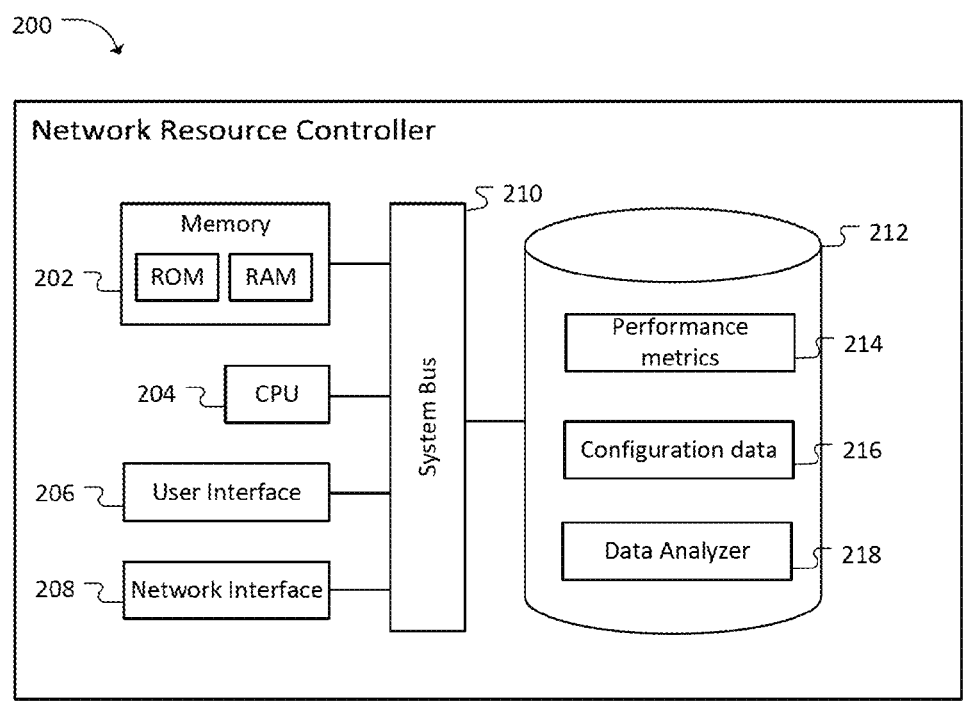
FIG. 2 illustrates a network resource controller according to an embodiment.

FIG. 2 illustrates a block diagram of an NRC 200 that may be representative of any of the network controller devices 110a-c. In an embodiment, one or more of the network controller devices 110a-c are SON controllers. The NRC 200 includes one or more processor devices including a central processing unit (CPU) 204. The CPU 204 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. Storage device 212 may include performance metrics 214, configuration data 216, and data analyzer 218. Data analyzer 318 may include program information for executing one or more of the processes described below, such as determining network operational status and normalization of data.

The NRC 200 may also include a user interface 206 that allows an administrator to interact with the NRC's software and hardware resources and to display the performance and operation of the wireless communication system 100. In addition, the NRC 200 may include a network interface 206 for communicating with other components in the networked computer system, and a system bus 210 that facilitates data communications between the hardware resources of the NRC 300.

In addition to the network controller devices 110a-c, the NRC 200 may be used to implement other types of computer devices, such as an antenna controller, an RF planning engine, a core network element, a database system, or the like. Based on the functionality provided by an NRC, the storage device of such a computer serves as a repository for software and database.

Figure 3:
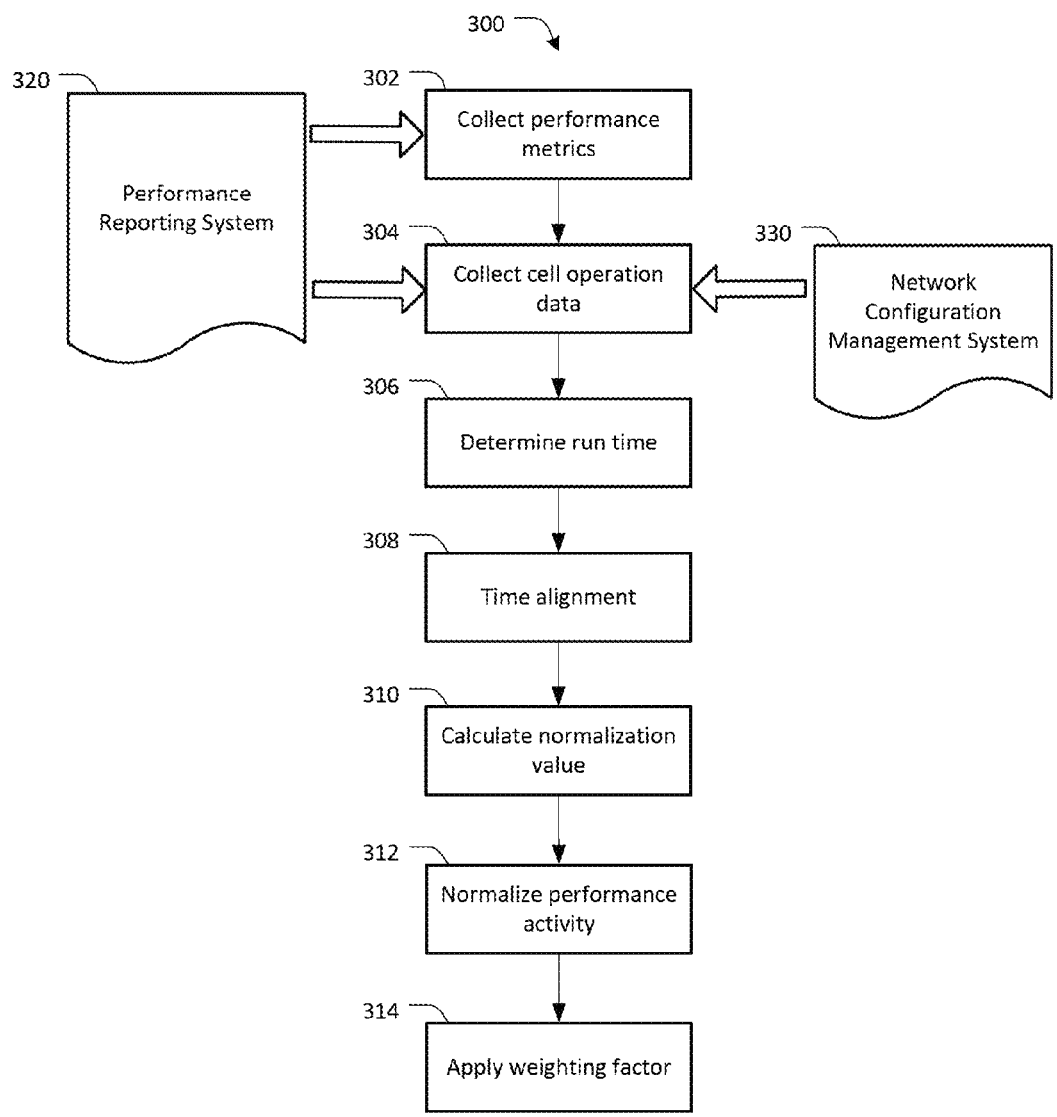
FIG. 3 illustrates tracking and utilizing operational run time according to an embodiment.

FIG. 3 shows an embodiment of a process 300 of tracking and using operational run time data. Process 300 may be performed in various ways including on an ongoing basis as an aspect of a self-optimizing network, performed discretely according to circumstances such as adding a network element or when performing maintenance on a network element.

In step 302, performance metrics relevant to the operational status of a network element are collected. In addition, information regarding the observation time period over which these metrics may be collected. Persons of skill in the art will recognize that in various embodiments the network element may be a cell, a base station, or other element in a wireless network. For the sake of clarity and consistency, examples in this disclosure use a cell as the network element. A cell for which operational information is being processed will be referred to as a target cell.

In some embodiments, supporting metrics are transmitted from a performance reporting system 320. In other embodiments, the performance metrics are sent from a base station or other entity that collects metrics in a communications network.

In step 304, cell operation data is collected. The cell operation data may be collected from a performance reporting system 320, a network configuration management system 330, or any entity or combination of entities that collects or stores operation data in a communications system. Operation data includes configuration management information and performance data.

In step 306, the run time of the target cell is determined. The run time may be determined using performance metrics collected in step 302, cell operation data collected at 304, or both.

In step 308, data is aligned in time. The data that is aligned may include run time data, configuration data, and performance metrics. Time alignment may include interpolation or decimation. For example, run time may be determined from step 306 in 1 minute intervals, while a first performance metric is reported at 5 minute intervals. In this example, the first performance metric may be interpolated to match the rate of the run time, or the run time may be decimated to match the rate of the performance metric. Times may be aligned so that run time observations and metrics data periods are synchronized.

In step 310, an operational run time normalization value expressed as a total run time and/or a percentage of the total metrics collection time window is calculated using performance metrics, configuration data, or a combination of the two.

In step 312, specific performance metrics are normalized by the operational run time normalization value from 310. The performance metrics are normalized to account for times during which the target cell may not have been fully operational. The normalization metric may be used to support subsequent performance or activity comparisons between cells with different operational run time status during the performance observation window.

A weighting factor may be applied to performance data in step 314. For example, performance data may be weighted according to expected activity levels based on historical or comparative data for a particular day of the week, time of the day, geographical area, etc.

In an embodiment, network elements that have not been operationally active for a defined minimum time may be excluded from automated optimization until they have been operational for the defined minimum time limits. Other embodiments may apply particular optimization rules to network elements that have been operationally active for long or short time periods relative to other network elements undergoing simultaneous optimization by the external automated optimization processes. Run time normalized metrics may be returned to the external self-optimization processes that initiated the supporting normalization process, or may be calculated as part of the same processes.

Figure 4:
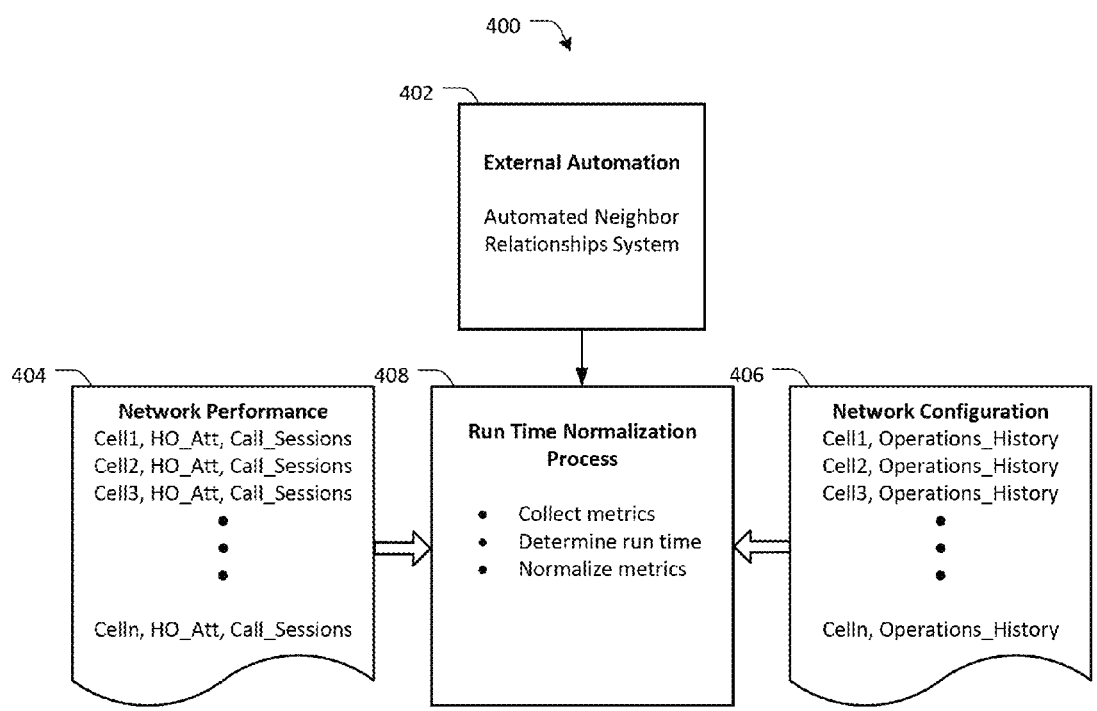
FIG. 4 illustrates a normalization process according to an embodiment.

FIG. 4 illustrates an embodiment of a normalization process 400. Process 400 is also an example of implementing process 300 of tracking and using operational run time data.

In an embodiment, process 400 may be in the category of Automatic Neighbor Relations (ANR). ANR algorithms compare network performance statistics associated with different cells for the purpose of managing cell site neighbor lists. In this embodiment the ANR algorithm initiated by ANR system 402 compares handover attempts (HO_Att) to each listed cell to determine which potential neighbor cells had the highest number of historical handover attempts over a predetermined observation time period. Additional network performance information 404 in this example includes a number of call sessions carried by each cell over the observation period.

This example also includes inputs from a network configuration management system that provides operation information for each of the cells in question over the same observation period. In the example of FIG. 4, configuration information 406 from the Network Configuration Management system is used to determine the operational run time of one or more target cell. Although FIG. 4 shows both performance information 404 and configuration information 406 being used to determine operational run time, various embodiments may simply use one or the other.

In an embodiment, the operational run time is determined by dividing a number of total call sessions included in performance information 404 by a number of expected call sessions. The number of expected call sessions may be determined based on historical data of the target cell, or from data such as first and second order statistics from one or more cells satisfying predetermined criteria. The criteria may include a distance from the target cell, size or location of coverage area, type of radio access technology, etc. The value resulting from dividing the number of call sessions by the number of expected call sessions is a percentage value of operational run time. In other embodiments, performance metrics other than call sessions may be used to determine operational run time.

In another embodiment, the operational run time is determined from operational run time history obtained on a per-cell basis from the configuration management system.

Operational run time normalized handover attempts may be calculated in a normalization process 408 by dividing the number of handover attempts for the target cell by the percentage of operational run time. The process may then return run time normalized metrics of interest for additional processing and to support a normalized comparison of historical metrics.

In an example of process 400, Cell1 may have 1000 handover attempts and have been 100% active over the metrics observation time period, while Cell2 may have had 800 handover attempts but was only active for 40% of the observation window. In this example, Cell2 would have a higher normalized handover attempt value of 2000 compared to Cell1's normalized handover attempt value of 1000.

Figure 5:
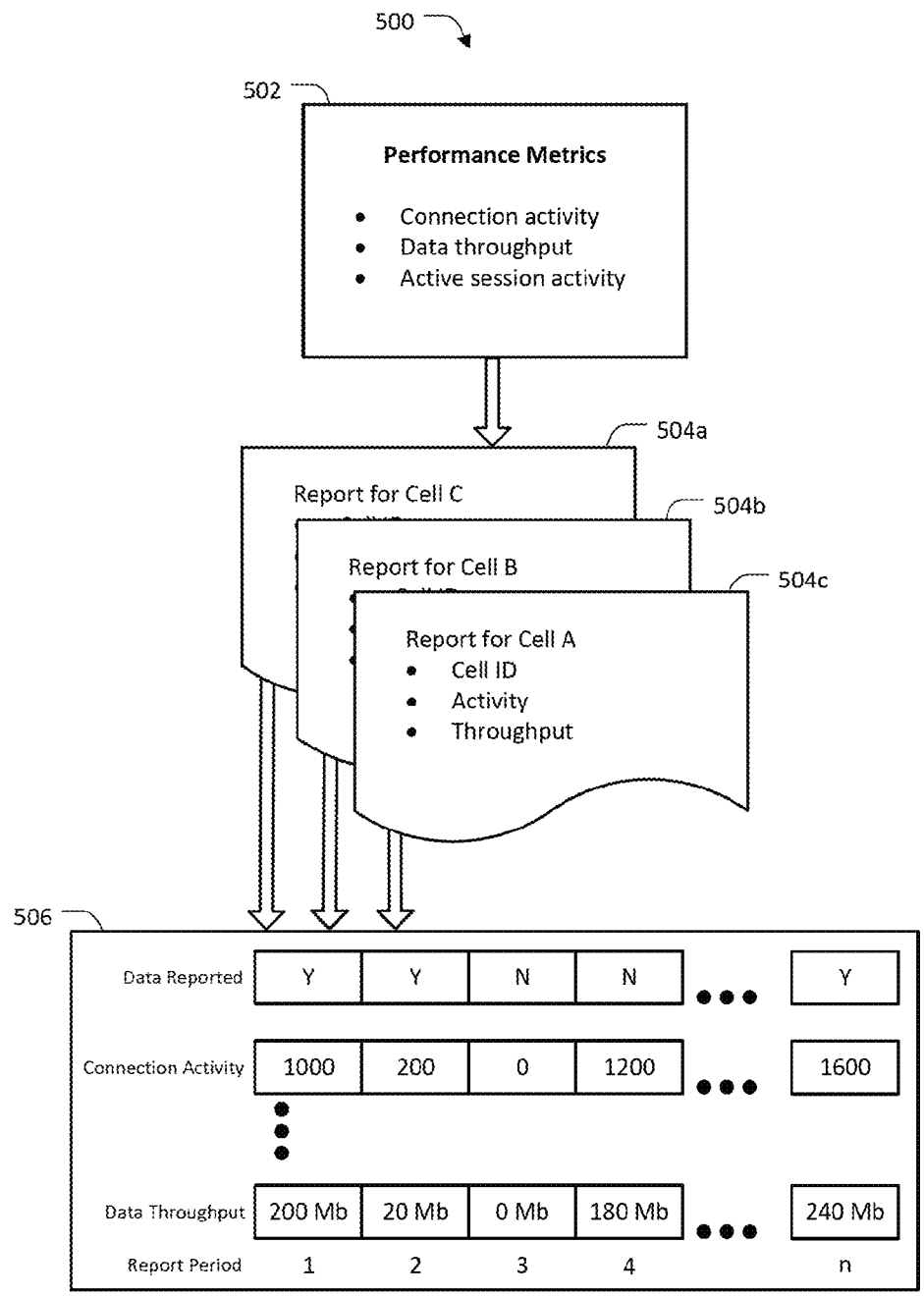
FIG. 5 illustrates determining operational status using performance data according to an embodiment.

FIG. 5 illustrates an embodiment of a process 500 of determining operational status during a time interval based on performance metrics 502. In the example shown in FIG. 5, the performance metrics 502 are collected by a network performance reporting system.

In the embodiment of FIG. 5, periodic reports 504a-c are expected at regular times for each cell. For each cell, data 506 are collected for each periodic reporting period. For each cell and each reporting period (numbered as 1-n), the existence or lack of report for a network cell is logged along with one or more performance metrics.

In the embodiment of FIG. 5, connection activity such as the number of connections logged by the network cell during this metrics reporting period are logged and overall data throughput for the network cell are periodically reported. However, these metrics are only examples of many possible reported metrics which can be used to determine operational run time.

There are several ways that data 506 can be used to determine operational status. In one embodiment, operational status may be determined from the lack of an expected performance metrics report for report periods. In FIG. 5, data 506 shows the presence or lack of data being reported through yes ("Y") or no ("N") values in the "Data Reported" row.

In another embodiment, connection activity may be used to determine operational run time status using performance metrics. This can be accomplished by comparing reported connection activity value to a predetermined threshold value. Using the example of FIG. 5, if the predetermined threshold value is 300, then a system would determine that a cell was not operational for report periods 2 and 3. If the predetermined threshold value for connection activity is 50, then the system would determine that the cell was not operational for time period 3.

In still another embodiment, data throughput may be used to determine operational run time status using performance metrics. This can be accomplished by comparing reported data throughput to a predetermined threshold value. Using the example of FIG. 5, if the predetermined threshold value is 50, then a system would determine that a cell was not operational for report periods 2 and 3. If the predetermined threshold value for connection activity is 10, then the system would determine that the cell was not operational for time period 3.

In some embodiments, the predetermined values may be set based on a time of day, a day of the week, etc. In such a case, a predetermined threshold value is higher during a time of day and day of the week when higher levels of network usage are expected, and lower during times and days where lower network usage is expected. The threshold values may be determined manually or automatically, and may be based on historical data.

Various embodiments may use one or more metric to infer operational status of each network element during each reporting interval. The operational run time is then determined as the sum of the time periods for which the network element was determined to be in a normal operating state.

In an embodiment which utilizes cell activity metrics to infer operational run time, it is possible that a given cell is operational for a portion of the cell's performance reporting time window. For instance, the system may be configured to report performance metrics on an hourly or multi hour basis, and a target cell may be operational for only a portion of that reporting period. In this case certain metrics would be reported, but for only the portion of time in which the cell was operational.

The magnitude of metrics such as connection attempts, data throughput, etc. for a cell that is non-operational for a portion of a reporting period would be expected to be low compared to a fully functional cell operating for the entire reporting period. In this case, the use of an activity threshold to determine operational status and/or a scaled operational status metric (e.g. 40% operational status if activity metrics represent only 40% of expected activity metrics) may be derived from performance metric reports. The establishment of appropriate thresholds or expected activity means and standard deviations may be derived from history of the same metrics for the target cell or from statistics derived from nearby cells over the same or similar time periods.

In addition to the running history of performance reports and specific performance metric values, an absolute time reference for each report may be captured to allow synchronization to other reported metrics for the purpose of metrics normalization. For instance, a time stamp on the reports 504a-c illustrated in FIG. 5 may be subsequently used during the metrics normalization process such that cell operational status is properly associated with specific metrics captured for each network element.

Figure 6:
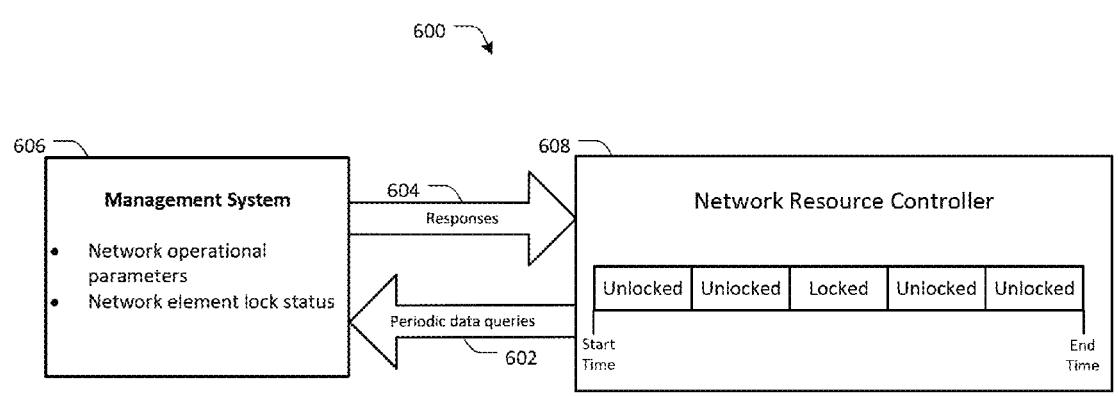
FIG. 6 illustrates determining operational status using management data according to an embodiment.

FIG. 6 illustrates a process 600 of determining percentage of operational run time for a given network element from queries to a management system 606. In an embodiment, periodic queries 602 are made to the management system 606, and the query responses 604 are returned to a network resource controller 608 and recorded in a time stamped history log. In this example network element lock or unlock state is queried, which represents one possible configuration parameter of interest. In the example, a network element being in a lock state indicates that the network element is non-operational and it being in an unlocked state indicates that it is operational. Persons of skill in the art will recognize that other data from a management system can be used to determine operational run time status in other embodiments.

In the example shown in FIG. 6, five time-stamped queries are made at regular intervals to the management system 606 which is a configuration management system in this example. Four of the queries are returned with operational status as defined by the network element being in an unlocked state. The fifth is determined to be non-operational due to the network element being in a locked state. In this example, the network element is determined to be 80% operational across the time window between the start and end times of this management query window.

The time window of interest for queries to the management system 606 may be aligned with data extension or truncation (e.g. decimation or interpolation) to obtain time alignment between performance metrics and operational run time normalization status as discussed above with respect to FIG. 3.

In another embodiment, the management system 606 is an alarm management system. In such an embodiment, periodic queries 602 request an alarm status, and operational status may be inferred from an alarm state. Time periods for which an alarm condition is active may be treated as non-operational in performance reports even when a target cell is fully or partially operational based on the alarm designation. In another embodiment, when a query does not receive a response within a predetermined time period, non-operational status may be inferred from the lack of response.

Embodiments may consider both state data from a management system and performance metrics in order to determine operational status. When a cell is installed, it may be activated in a management system before it is actively transferring data between user equipment and a backhaul. In this example, an alarm status or a performance metric such as data throughput may supersede a connection activity metric to determine that a cell is not operational for a time interval.

Some systems in a communication network have reporting intervals that are several hours, 24 hours, or longer. For example, aspects of ANR may use daily reporting intervals to support certain functions. When a cell that was not active at the beginning of a reporting interval is installed during the reporting interval, such systems may not acknowledge the presence of the cell until the end of a reporting interval. In a conventional system, the first reporting interval would report performance that is degraded in proportion to the duration of the reporting interval in which the cell was not operational. In this case, performance is under-reported so the cell is not properly utilized by automated systems, and it could take multiple reporting cycles to properly integrate the new cell.

Embodiments of the present invention account for the portion of the reporting interval that the cell is offline, so automated systems can work with accurate data from the first reporting cycle. In addition, an embodiment integrates with automated systems to report performance metrics before a full reporting interval is complete.

Figure 7:
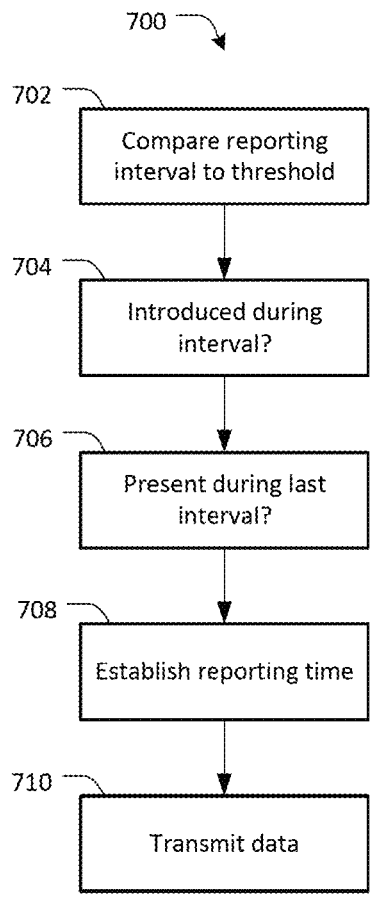
FIG. 7 illustrates a process for a network element introduced during a reporting interval according to an embodiment.

FIG. 7 illustrates a process 700 of reporting data for a cell introduced during a reporting interval. In step 702, the duration of reporting intervals for the cell are compared to a threshold value. If a particular reporting interval is less than the threshold value, then the process 700 is terminated, and another reporting interval may be analyzed. Examples of a threshold value are 2 hours, 6 hours, 12 hours, 24 hours, and one week. In an embodiment, specific reporting intervals to which process 700 applies are designated in a database and step 702 is not performed.

Step 704 determines whether the cell was introduced during a reporting interval that exceeds the threshold of step 702. A cell that was introduced during the reporting interval is a cell that was not operational at the beginning of the reporting interval, and became operational during the reporting interval.

Step 706 determines whether a cell that was introduced during a reporting interval was operational for at least a portion of the previous reporting interval. When the cell was present in the last reporting interval, normalized performance data may have been reported for the previous reporting interval, in which case the process may terminate.

Step 708 determines a reporting time that is less than the reporting interval. An embodiment may incorporate data from a cell introduced during a reporting interval prior to the expiration of that interval. For example, when a cell is newly installed at 6 AM, a 24 hour reporting interval that runs from 12 AM-12 AM may not use data from the cell for 18 hours.

Accordingly, step 708 may be performed to establish a reporting time that is less than the reporting interval. In an embodiment, the interval is a predetermined value such as a percentage of the reporting interval or of the time remaining in a reporting interval. In other embodiments, the reporting time is a set value such as ten minutes, one hour, three hours, or six hours. This step may not be performed if the time remaining in the reporting interval is less than the reporting time.

Data is transmitted to the network entity receiving reports for the reporting interval in step 710. The data may be normalized according to step 312. In addition, the data may be weighted according to expected performance levels.

Figure 8:
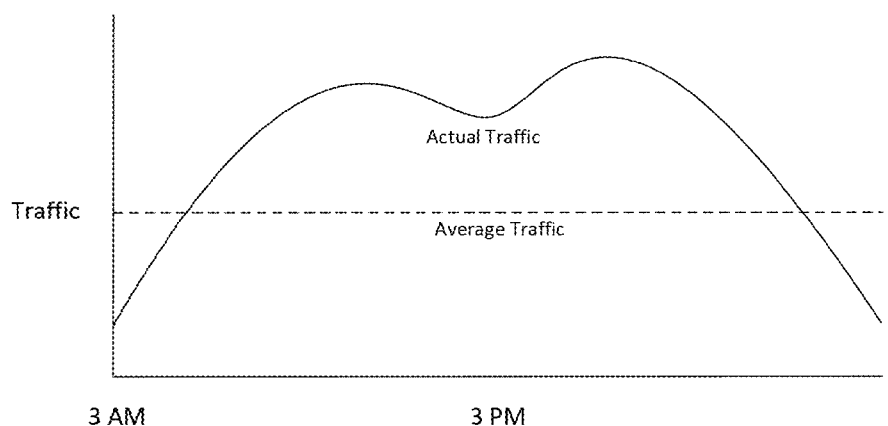
FIG. 8 illustrates variance in cellular traffic over a day.

FIG. 8 illustrates traffic levels in a cellular communications system over a 24 hour period. Traffic levels are typically lower in the late night and early morning, and peak levels often occur during rush-hour times at around 9 AM and 5 PM. Cellular traffic tends to vary in a regular fashion according to a time of day and a day of the week.

The graph of FIG. 8 shows actual traffic values and average traffic values over the 24-hour period. The average value is used by some systems that receive performance reports. When interim data is reported according to step 710, the interim data will be influenced by the level of traffic at that time of day, and may not represent the average traffic level that would result from a cell that is active for a full reporting interval.

Accordingly, embodiments of the present invention may apply a weighting factor according to expected performance of a cell. The expected performance may be determined based on historical data of the target cell, or based on present or historical data from one or more cell similar to the target cell. Similarities may be in location, technology, transmit power, or other characteristics of the cell or other network element.

In an embodiment, data from a cell that is introduced during a reporting interval such as a new cell in a network is not reported to automated systems such as ANR until a buffer period has expired. The buffer period may be all or a portion of a reporting interval. In one embodiment, the buffer is the amount of time remaining in the present interval plus the full time of the following interval, so that data for the target cell is not reported until a full time interval in which the target cell is operational passes.

Embodiments of the present invention may be implemented in conjunction with one or more automated network optimization processes such as ANR and SON optimization.

What is claimed is:

1. A system for normalizing a performance metric in a wireless communication network, the system comprising:
    a memory;
    a processor; and
    a non-transitory computer readable medium associated with the processor, the computer readable medium having computer executable instructions stored thereon which, when executed by the processor, perform the following steps:
    collecting operation data of a network element over a plurality of data collection time periods;
    determining operational run time of the network element based on the operation data, the operational run time corresponding to an amount of time the network element is operational;
    calculating a normalization value based on the operational run time; and
    normalizing the performance metric for the network element using the normalization value,
    wherein the normalized performance metric is used as a performance metric for the network element in an automated network optimization process.

2. The system of claim 1, wherein the operation data is chosen from performance data and configuration data.

3. The system of claim 2, wherein the performance data is chosen from a connection activity metric and a data throughput metric.

4. The system of claim 2, wherein the configuration data is collected from a configuration management system, an alarm management system, or both.

5. The system of claim 1, wherein the instructions executed by the processor further include aligning first operation data with second operation data in time.

6. The system of claim 5, wherein aligning the first operation data with the second operation data in time includes interpolation or decimation to match a periodicity of the first operation data to a periodicity of the second operation data.

7. The system of claim 1, wherein determining operational run time of the network element includes determining an operational status for each data collection time period in the plurality of data collection time periods.

8. The system of claim 7, wherein determining operational status for each data collection period includes:
    receiving data indicating a locked state or an unlocked state for each collection time period from a configuration management system;
    designating a first collection time period as non-operational when the data for the first collection time period indicates a locked state; and
    designating a second collection time period as operational when the data for the first collection time period indicates an unlocked state.

9. The system of claim 7, wherein determining operational status for each data collection period includes:
    receiving performance data values for the plurality of data collection time periods;
    comparing each performance data value to a threshold value;
    when a compared performance data value is less than the threshold value, designating a time period associated with the compared performance metric data as non-operational; and
    when the compared performance data value is more than the threshold value, designating the time period associated with the compared performance metric data as operational.

10. The system of claim 1, wherein the instructions executed by the processor further include weighting the normalized performance metric according to a weighting factor based on at least the time of day in which the operational run time was determined.

11. The system of claim 1, wherein the instructions executed by the processor further include:
    determining whether the network element was introduced during a reporting interval with a duration exceeding a threshold value;
    when the network element is introduced during the reporting interval with a duration exceeding the threshold value, reporting the normalized performance metric for the network element during the reporting interval exceeding the threshold value.

12. A method for normalizing a performance metric in a wireless communication network, the method comprising:
    collecting operation data of a network element over a plurality of data collection time periods;
    determining operational run time of the network element based on the operation data, the operational run time corresponding to an amount of time the network element is operational;
    calculating a normalization value based on the operational run time; and
    normalizing the performance metric for the network element using the normalization value; and
    using the normalized performance metric as a performance metric for the network element in an automated network optimization process.

13. The method of claim 12, wherein the operation data is chosen from performance data and configuration data,
    the performance data is chosen from a connection activity metric and a data throughput metric, and
    the configuration data is collected from a configuration management system, an alarm management system, or both.

14. The method of claim 12, wherein the instructions executed by the processor further include aligning first operation data with second operation data in time, and
    wherein aligning the first operation data with the second operation data in time includes interpolation or decimation to match a periodicity of the first operation data to a periodicity of the second operation data.

15. The method of claim 12, wherein determining operational run time of the network element includes determining an operational status for each data collection time period in the plurality of data collection time periods, and wherein determining operational status for each data collection period includes:
    receiving data indicating a locked state or an unlocked state for each collection time period from a configuration management system;
    designating a first collection time period as non-operational when the data for the first collection time period indicates a locked state; and
    designating a second collection time period as operational when the data for the first collection time period indicates an unlocked state.

16. The method of claim 12, wherein determining operational run time of the network element includes determining an operational status for each data collection time period in the plurality of data collection time periods, and wherein determining operational status for each data collection period includes:

receiving performance data values for the plurality of data collection time periods;

comparing each performance data value to a threshold value;

when a compared performance data value is less than the threshold value, designating a time period associated with the compared performance metric data as non-operational; and when the compared performance data value is more than the threshold value, designating the time period associated with the compared performance metric data as operational.

17. The method of claim 12, wherein the instructions executed by the processor further include weighting the normalized performance metric according to a weighting factor based on at least the time of day in which the operational run time was determined.

18. The method of claim 12, wherein the instructions executed by the processor further include:

determining whether the network element was introduced during a reporting interval with a duration of at least six hours;

when the network element is introduced during the reporting interval with a duration of at least six hours, reporting the normalized performance metric for the network element during the reporting interval of at least six hours.

19. The method of claim 12, wherein collecting the operation data includes at least one of receiving a plurality of first signals indicating performance data from a performance reporting system, and receiving a plurality of second signals indicating a configuration status from a configuration management system.

20. A non-transitory computer readable medium with computer executable instructions stored thereon which, when executed by a processor, perform the following steps:

collecting operation data of a network element over a plurality of data collection time periods;

determining operational run time of the network element based on the operation data, the operational run time corresponding to an amount of time the network element is operational;

calculating a normalization value based on the operational run time; and normalizing the performance metric for the network element using the normalization value, wherein the normalized performance metric is used as a performance metric for the network element in an automated network optimization process.

* * * * *